United States Patent
Ohara

(10) Patent No.: US 12,035,372 B2
(45) Date of Patent: Jul. 9, 2024

(54) USER EQUIPMENT

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 372 days.

(21) Appl. No.: 17/429,154

(22) PCT Filed: Feb. 14, 2019

(86) PCT No.: PCT/JP2019/005451
§ 371 (c)(1),
(2) Date: Aug. 6, 2021

(87) PCT Pub. No.: WO2020/166044
PCT Pub. Date: Aug. 20, 2020

(65) Prior Publication Data
US 2022/0039171 A1  Feb. 3, 2022

(51) Int. Cl.
*H04W 74/08* (2024.01)
*H04W 72/04* (2023.01)
*H04W 74/0833* (2024.01)

(52) U.S. Cl.
CPC ....... *H04W 74/0833* (2013.01); *H04W 72/04* (2013.01)

(58) Field of Classification Search
CPC ............ H04W 72/04; H04W 74/0833
See application file for complete search history.

(56) References Cited

U.S. PATENT DOCUMENTS

| | | |
|---|---|---|
| 2018/0124626 A1 | 5/2018 | Tsai et al. |
| 2020/0045650 A1 | 2/2020 | Suzuki et al. |
| 2021/0136827 A1* | 5/2021 | Xiong ................ H04W 74/004 |

FOREIGN PATENT DOCUMENTS

| | | |
|---|---|---|
| WO | 2015/137632 A1 | 9/2015 |
| WO | 2018/151230 A1 | 8/2018 |

OTHER PUBLICATIONS

Extended European Search Report issued in counterpart European Patent Application No. 19915253.9, dated Jul. 11, 2022 (11 pages).
InterDigital; "2-Step RACH Procedure"; 3GPP TSG-RAN WG2 Meeting #103bis, R2-1814008; Chengdu, China; Oct. 8-12, 2018 (5 pages).
International Search Report issued in PCT/JP2019/005451 dated May 7, 2019 (4 pages).
Written Opinion of the International Searching Authority issued in PCT/JP2019/005451 dated May 7, 2019 (4 pages).
(Continued)

*Primary Examiner* — Mansour Oveissi
*Assistant Examiner* — David M Oveissi
(74) *Attorney, Agent, or Firm* — Osha Bergman Watanabe & Burton LLP

(57) ABSTRACT

A user equipment includes a transmitting unit that transmits first data in a first step of a 2-step RACH for a contention based random access procedure and a receiving unit that receives second data in a second step of the 2-step RACH for the contention based random access procedure. The first data includes a preamble and a PUSCH and information indicating a predetermined correspondence relationship of a PUSCH resource is indicated or defined.

3 Claims, 5 Drawing Sheets

(56) References Cited

OTHER PUBLICATIONS

Huawei, Hisicion; "consideration on 2-step RACH parameters and grant"; 3GPP TSG-RAN WG2 Meeting #104, R2-1816605; Spokane, US; Nov. 12-16, 2018 (3 pages).
Samsung; "Initial Access and Mobility Procedure for NR-U"; 3GPP TSG RAN WG1 Meeting #94, R1-1808769; Gothenburg, Sweden; Aug. 20-24, 2018 (8 pages).
3GPP TS 38.300 V15.0.0; "3rd Generation Partnership Project; Technical Specification Group Radio Access Network; NR; NR and NG-RAN Overall description; Stage 2 (Release 15)"; Dec. 2017 (68 pages).
Office Action issued in Chinese Application No. 201980091231.9, dated Sep. 29, 2023 (21 pages).

* cited by examiner

USER EQUIPMENT

TECHNICAL FIELD

The present invention relates to a user equipment in a wireless communication system.

BACKGROUND ART

In 3rd Generation Partnership Project (3GPP), for example, a wireless communication system called 5G or New Radio (NR) has been discussed in order to further increase system capacity and a data transfer rate and to further reduce latency in a radio section (for example, Non-Patent Document 1). In NR, various wireless techniques have been discussed in order to satisfy the requirement that the delay in the wireless communication area is 1 ms or less while achieving a throughput of 10 Gbps or more.

In a 4-step RACH according to the related art, a contention based random access procedure is performed in four steps. In contrast, in NR, a discussion about a 2-step RACH in which the contention based random access is performed in two steps has started. With the 2-step RACH, the effect of reducing delay and power consumption, for example, is expected to be obtained.

In the 4-step RACH for the contention based random access procedure, a user equipment 20 transmits a message Msg1 (preamble) to a base station apparatus 10 in a first step. The base station apparatus 10 transmits a message Msg2 (random access response (RAR)) to the user equipment 20 in a second step. The user equipment 20 transmits a message Msg3 to the base station apparatus 10 in a third step. The base station apparatus 10 transmits a message Msg4 to the user equipment 20 in a fourth step.

CITATION LIST

Non-Patent Document

Non-Patent Document 1: 3GPP TS 38.300 V15.0.0 (2017-12)

SUMMARY OF THE INVENTION

Problem to be Solved by the Invention

In the 2-step RACH for the contention based random access procedure, the user equipment 20 transmits a message MsgA to the base station apparatus 10 in a first step and the base station apparatus 10 transmits a message MsgB to the user equipment 20 in a second step. The message MsgA includes a preamble+data (Physical Uplink Shared Channel (PUSCH)) and corresponds to Msg1+Msg3 in the 4-step RACH. The message MsgB corresponds to Msg2+Msg4 in the 4-step RACH. In order for the base station apparatus 10 that has received the message MsgA from the user equipment 20 to appropriately transmit the message MsgB, it is necessary to appropriately determine a correspondence relationship between the preamble and the PUSCH included in the message MsgA.

The invention has been made in view of the above-mentioned problems and an object of the invention is to provide a technique that can appropriately determine a correspondence relationship between a preamble and a PUSCH included in a message MsgA transmitted from a user equipment in a wireless communication system to which a 2-step RACH for a contention based random access procedure is applied.

Means for Solving Problem

According to the present disclosure, there is provided a user equipment including: a transmitting unit that transmits first data in a first step of a 2-step RACH for a contention based random access procedure; and a receiving unit that receives second data in a second step of the 2-step RACH for the contention based random access procedure. The first data includes a preamble and a PUSCH and information indicating a predetermined correspondence relationship of a PUSCH resource is indicated or defined.

Effect of the Invention

According to the present disclosure, a technique is provided which can appropriately determine a correspondence relationship between a preamble and PUSCH included in a message MsgA transmitted from a user equipment in a wireless communication system to which a 2-step RACH for a contention based random access procedure is applied.

MODE(S) FOR CARRYING OUT THE INVENTION

Hereinafter, embodiments (these embodiments) of the invention will be described with reference to the drawings. The following embodiments are merely an example. The embodiments to which the invention is applied are not limited to the following embodiments.

It is assumed that wireless communication systems according to the following embodiments are basically based on NR. However, this is an example and some or all of the wireless communication systems according to the embodiments may be based on wireless communication systems (for example: LTE) other than NR.

(Overall Configuration of System)

Figure 1:
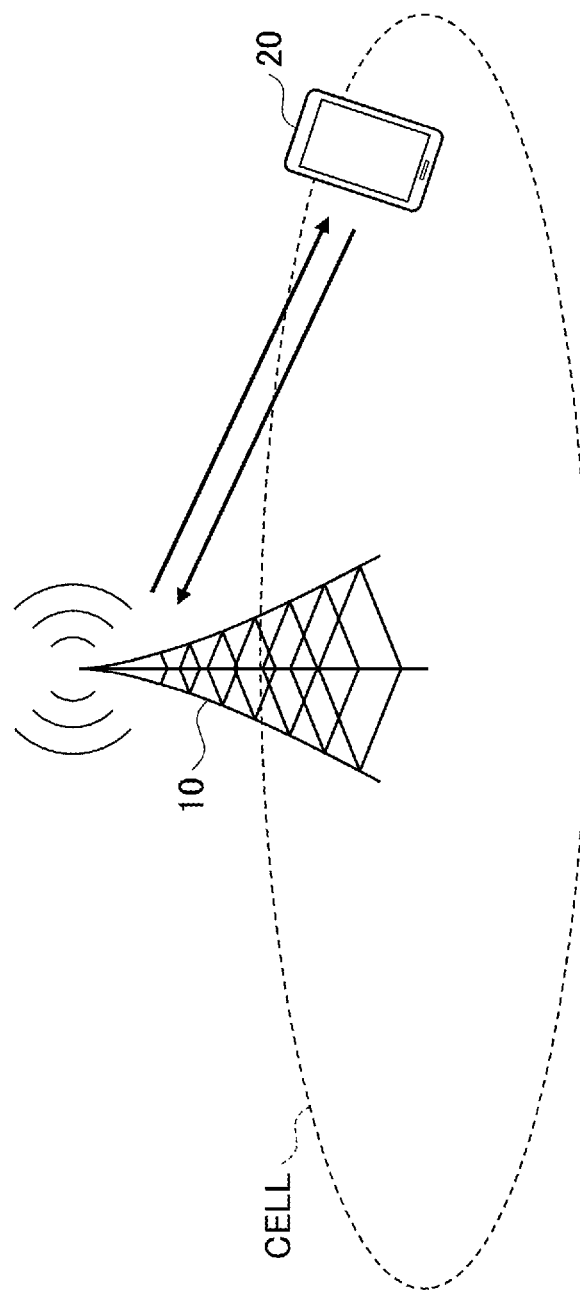
FIG. 1 is a diagram illustrating the configuration of a communication system in an embodiment of the invention.

FIG. 1 is a diagram illustrating the configuration of the wireless communication system according to this embodiment. As illustrated in FIG. 1, the wireless communication system according to this embodiment includes a base station apparatus 10 and a user equipment 20. In FIG. 1, one base station apparatus 10 and one user equipment 20 are illustrated. However, the invention is not limited thereto and a plurality of base station apparatuses 10 and a plurality of user equipments 20 may be provided.

The user equipment 20 is a communication device having a wireless communication function, such as a smart phone, a mobile phone, a tablet, a wearable terminal, or a machine-to-machine (M2M) communication module, is wirelessly connected to the base station apparatus 10, and uses various communication services provided by the wireless communication system. The base station apparatus 10 is a communication device that provides one or more cells and wirelessly communicates with the user equipment 20. Each of the user equipment 20 and the base station apparatus 10 performs beamforming to transmit and receive signals. Further, the user equipment 20 may be referred to as UE, and the base station apparatus 10 may be referred to as gNB.

In this embodiment, a duplex system may be a time division duplex (TDD) system or a frequency division duplex (FDD) system.

The technique according to this embodiment relates to a contention based random access procedure in NR. First, an example of the operation of a 4-step RACH for the contention based random access procedure and an example of the operation of a 2-step RACH for the contention based random access procedure will be described.

(Contention Based Random Access Procedure: 4-Step RACH)

Figure 2:
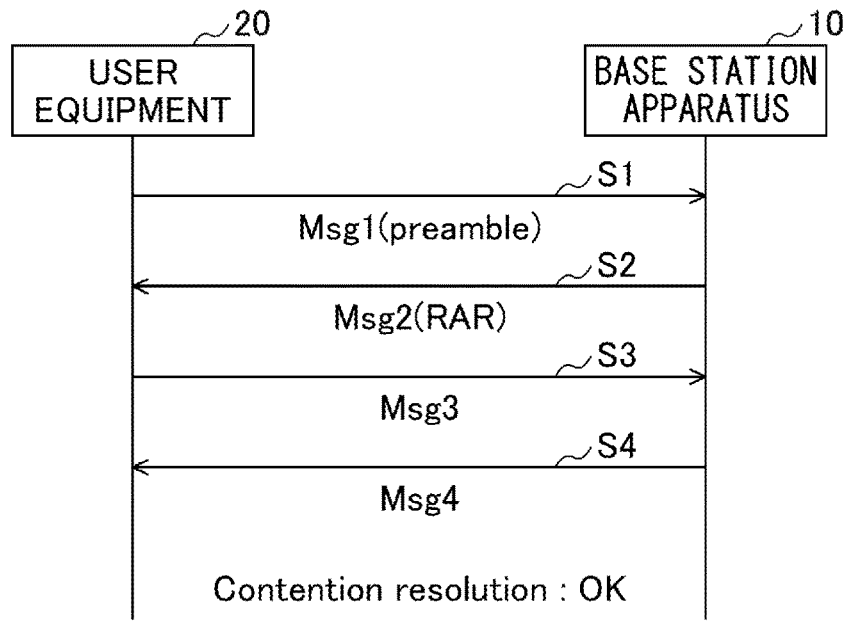
FIG. 2 is a diagram illustrating a 4-step RACH for a contention based random access procedure.

FIG. 2 is a diagram illustrating the 4-step RACH for the contention based random access procedure.

The user equipment 20 transmits a message Msg1 (=a preamble) in a first step (S1).

Upon detecting the preamble, the base station apparatus 10 transmits a message Msg2 (=a random access response (RAR)), which is a response to the preamble to the user equipment 20, in a second step (S2).

Upon receiving the RAR, the user equipment 20 transmits a message Msg3 including predetermined information to the base station apparatus 10 in a third step (S3). The message Msg3 is, for example, an RRC connection request.

Upon receiving the message Msg3, the base station apparatus 10 transmits a message Msg4 (for example: RRC connection setup) to the user equipment 20 in a fourth step (S4). When it is confirmed that the predetermined information is included in the message Msg4, the user equipment 20 recognizes that the message Msg4 is a message Msg4 addressed to the user equipment 20 in response to the message Msg3, completes the random access procedure, and establishes RRC connection (contention resolution: OK).

(Contention Based Random Access Procedure: 2-Step RACH)

Figure 3:
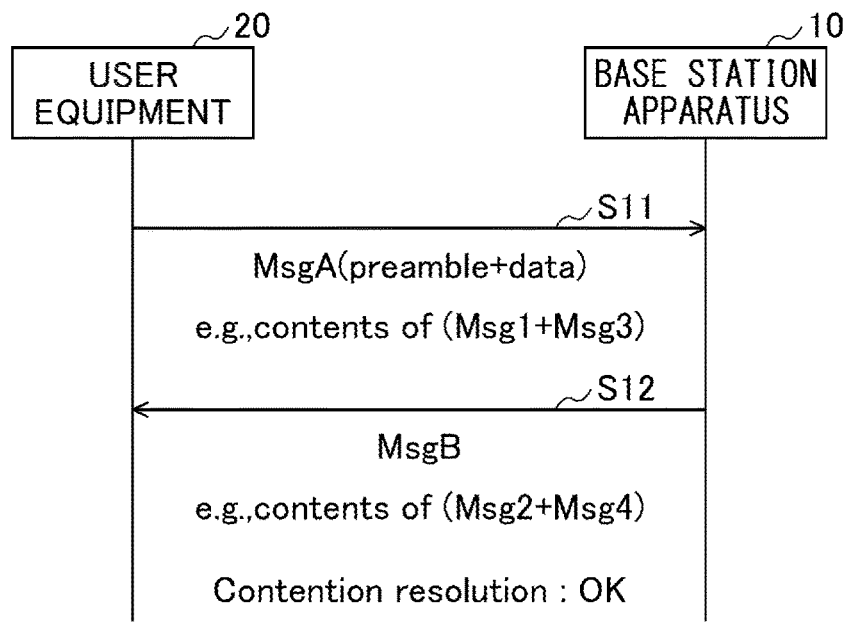
FIG. 3 is a diagram illustrating a 2-step RACH for a contention based random access procedure.

FIG. 3 is a diagram illustrating a 2-step RACH for a contention based random access procedure.

As illustrated in FIG. 3, in the 2-step RACH for the contention based random access procedure, in a first step (S11), the user equipment 20 transmits a message MsgA to the base station apparatus 10. In a second step (S12), the base station apparatus 10 transmits a message MsgB to the user equipment 20. When it is checked that predetermined information is included in the message MsgB, the user equipment 20 recognizes that the message MsgB is addressed to the user equipment 20 in response to the message MsgA, completes the random access procedure, and establishes RRC connection (contention resolution: OK).

The message MsgA includes preamble+data (Physical Uplink Shared Channel (PUSCH)) and corresponds to Msg1+Msg3 in the 4-step RACH. In addition, the message MsgB corresponds to Msg2+Msg4 in the 4-step RACH.

(Necessity to Determine Correspondence Relationship Between Preamble and PUSCH)

Figure 4:
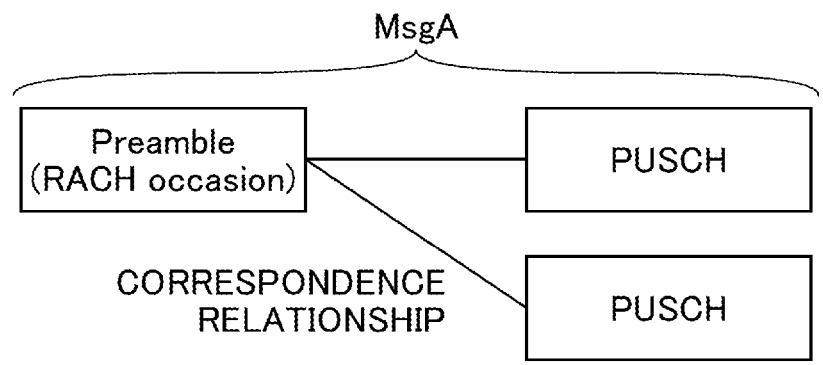
FIG. 4 is a diagram illustrating a preamble and PUSCH included in a message MsgA of the 2-step RACH.

FIG. 4 is a diagram illustrating the preamble and the PUSCH included in the message MsgA of the 2-step RACH.

In the case of the 2-step RACH, since preamble+PUSCH is transmitted as the message MsgA, it is necessary to consider the correspondence relationship between the preamble and the PUSCH.

For the preamble, in the same RACH occasion (resources for a PRACH preamble), in a case in which a plurality of user equipments 20 transmit a Physical Random Access Channel (PRACH) preamble using different preamble indexes, the probability that the base station apparatus 10 will distinguish the user equipments 20 is high. For example, it is assumed that there are 64 preamble indexes for one RACH occasion (PRACH preamble resource). In a case in which each of a user equipment 20A and a user equipment 20B randomly selects a preamble index and transmits a PRACH preamble, the probability that the preamble index randomly selected by the user equipment 20A and the preamble index randomly selected by the user equipment 20B will collide with each other is low. Therefore, the base station apparatus 10 can distinguish between the preamble from the user equipment 20A and the preamble from the user equipment 20B with a high probability.

Unlike in the case described above where the preambles can be distinguished with a high probability, in general, it is difficult for the base station apparatus 10 to distinguish the transmission of the PUSCH from a plurality of user equipments 20 using the same resource.

In consideration of the contention based random access procedure, although there is a possibility that PUSCH resources will collide with each other, the PUSCH resources can be shared by a plurality of user equipments 20. However, in a case in which one resource is shared by the same number of user equipments 20, the probability that the preamble resources collide with each other is not usually equal to the probability that the PUSCH resources collide with each other.

Therefore, it is necessary to appropriately determine the correspondence relationship between the PUSCH and the preamble.

Embodiment 1

As Embodiment 1, it is considered that how many preamble indexes one PUSCH resource in the message MsgA corresponds to is indicated or defined.

The indication may be performed by the transmission of information indicating the correspondence relationship from the base station 10 to the user equipment 20. The indication is performed through a downlink (for example, MIB, SIB, RRC, MAC CE, or DCI) before the transmission of the message MsgA from the user equipment 20. In addition, the information indicating the correspondence relationship may be stored in the user equipment 20 in advance. That is, the correspondence relationship may be defined in advance in the user equipment 20. The user equipment 20 transmits the message MsgA according to the correspondence relationship with reference to the information indicating the correspondence relationship. In a case in which there is an indication from the base station 10, the user equipment 20 may transmit the message MsgA according to the correspondence relationship related to the indication. In a case in which there is no indication from the base station 10, the user equipment 20 may assume a correspondence relationship according to a predetermined rule and may transmit the message MsgA according to the correspondence relationship. The indication, definition, and use of the correspondence relationship are the same in the following embodiments.

For example, it may be indicated or defined that four preamble indexes correspond to one PUSCH resource. In this case, for example, assuming that 64 preamble indexes can be used in one RACH occasion (PRACH preamble resource), 16 PUSCH resources correspond to one RACH occasion.

The preamble indexes may be associated with the PUSCH resources in order from the head on the basis of the correspondence relationship in which "four preamble indexes correspond to one PUSCH resource". For example, the preamble indexes and the PUSCH resources may be associated with each other as follows: preamble indexes 0 to 3 are associated with a first PUSCH resource; preamble indexes 4 to 7 are associated with a second PUSCH resource; and preamble indexes 8 to 11 are associated with a third PUSCH resource.

Figure 5:
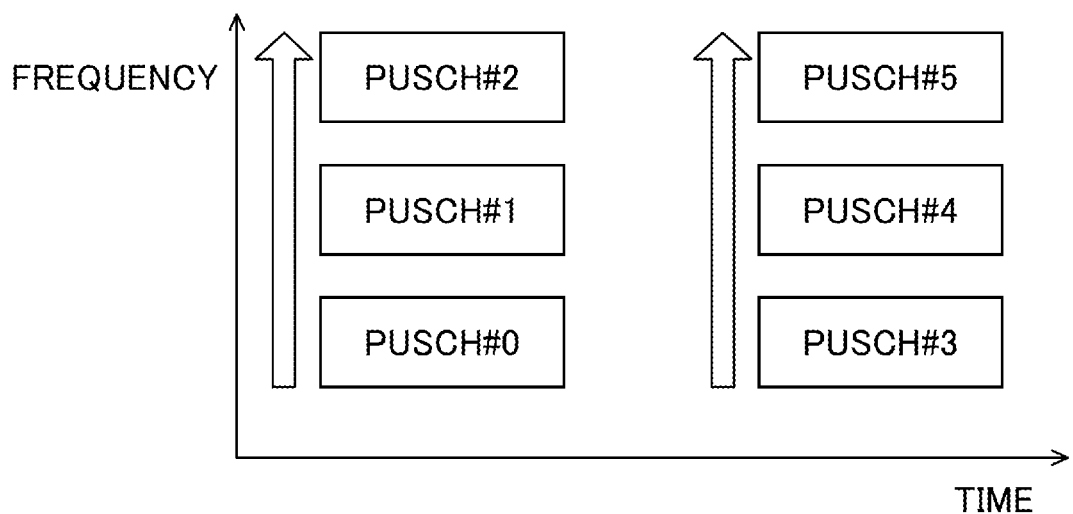
FIG. 5 is a diagram illustrating an example of the ordering of PUSCH resources.

The order numbers of the first PUSCH resource, the second PUSCH resource, the third PUSCH resource, ... may be given according to the positions of the PUSCH resources. For example, the order numbers may be given to the resources as follows: as illustrated in FIG. 5, the order numbers are given to the resources in the frequency direction (for example: a direction from a low frequency to a high frequency) at a first time position and the order numbers are given to the resources in the frequency direction at the next time position. In the example illustrated in FIG. 5, PUSCH resource #0 corresponds to preamble indexes 0 to 3, PUSCH resource #1 corresponds to preamble indexes 4 to 7, PUSCH resource #2 corresponds to preamble indexes 8 to 11, and PUSCH resource #3 corresponds to preamble indexes 12 to 15.

Embodiment 2

As Embodiment 2, it is considered that how many RACH occasions one PUSCH resource in the message MsgA corresponds to or how many PUSCH resources one RACH occasion corresponds to is indicated or defined.

As a first method when a plurality of PUSCH resources correspond to one RACH occasion, the preamble indexes in one RACH occasion may be divided by the number of PUSCH resources and then used. For example, in a case in which four PUSCH resources correspond to one RACH occasion and the number of preamble indexes in one RACH occasion is 64, 64 preamble indexes are divided by 4, which is the number of PUSCH resources, and thus 16 preamble indexes can be used for each PUSCH resource.

As a second method when a plurality of PUSCH resources correspond to one RACH occasion, in a case in which the one RACH occasion is used, a PUSCH resource may be randomly selected from the plurality of PUSCH resources.

For example, two RACH occasions may correspond to one PUSCH resource.

For example, two PUSCH resources may correspond to one RACH occasion. In this case, half of the preamble indexes in one RACH opportunity may be used by each of the two PUSCH resources. For example, in a case in which there are 64 preamble indexes in one RACH occasion, 32 preamble indexes may be used by each of the two PUSCH resources. Further, a PUSCH resource may be randomly selected from the two PUSCH resources.

When the RACH occasions are associated with the PUSCH resources, the association may be performed according to RACH occasion resource positions, PUSCH resource positions, and the order numbers of the preamble indexes.

As described in Embodiment 1, the order numbers may be given to the RACH occasions and the PUSCH resources in the order of the frequency direction and the time direction and the RACH occasions and the PUSCH resources may be associated with each other.

Embodiment 3

As Embodiment 3, it is considered that the PUSCH resource of the message MsgA used for each synchronization signal block SSB is designated or defined.

It is assumed that a correspondence relationship between the SSB and the RACH occasion already exists (the definition or indication of the correspondence relationship has been specified) (since the correspondence relationship between the SSB and the RACH occasion already exists, the correspondence relationship between the RACH occasion and the PUSCH resource is indirectly defined through the SSB by the designation or definition of the PUSCH resource of the message MsgA used for each SSB).

When the PUSCH resource of the message MsgA used for each SSB is designated or defined, the PUSCH resource of the message MsgA is selected on the basis of the selected SSB, regardless of which RACH occasion or preamble index is selected from a plurality of RACH occasions or preamble indexes corresponding to a certain SSB.

A plurality of PUSCH resources of the message MsgA may be designated or defined for each SSB. For example, the PUSCH resource may be randomly selected from the plurality of PUSCH resources.

Embodiment 4

As Embodiment 4, it is considered that the PUSCH resource of the message MsgA used for each user equipment 20 is designated or defined.

In a case in which the PUSCH resource of the message MsgA used for each user equipment 20 is designated or defined, a certain user equipment 20 transmits the preamble, using the PUSCH resource of the message MsgA designated or defined for the user equipment 20, regardless of which RACH occasion or preamble index is used.

The PUSCH resource of the message MsgA common to a plurality of SSBs may be designated or defined or the PUSCH resource of the message MsgA may be designated or defined for each SSB.

A plurality of PUSCH resources of the message MsgA may be designated or defined for each user equipment 20. For example, the PUSCH resource may be randomly selected from the plurality of PUSCH resources.

As a method for designating or defining the PUSCH resource for each user equipment 20, the PUSCH resource may be explicitly indicated. For example, the PUSCH resource may be defined on the basis of unique information, such as UE-ID, retained by the user equipment 20.

The designation or definition of the PUSCH resource for each user equipment 20 does not necessarily mean that different PUSCH resources are designated or defined for different user equipments 20. That is, a common PUSCH resource may be designated or defined for different user equipments 20.

Embodiment 5

As Embodiment 5, it is considered that the PUSCH resource of the message MsgA is designated using a RACH configuration index.

In addition, a change in an offset (which may be any offset such as an offset for a system frame number, an offset for a subframe, an offset for a slot, or an offset for a symbol) for the resource designated by the RACH configuration index or a period (for example, by two times, four times, or half) may be indicated.

As such, the change in the offset or the period makes it possible to avoid the overlap between the PUSCH resource and the RACH occasion. The period may be a RACH configuration period (RACH config period).

For the PUSCH resource of the message MsgA, only the change in the offset or the period may be indicated using the RACH configuration index designated by the RACH occasion without any change.

In addition, the corresponding PUSCH resource may be indicated by the indication of the offset from the RACH occasion. That is, the offset from the resource that has transmitted the preamble to the corresponding PUSCH resource is indicated. For example, a plurality of PUSCH resources may be prepared in the frequency direction such that the plurality of PUSCH resources correspond. In addition, the PUSCH resources may be arranged on the basis of the offset from all of the RACH occasions or the PUSCH resources may be arranged on the basis of the offset from some of the RACH occasions. For example, the PUSCH resources may be arranged on the basis of the offset only from the even-numbered RACH occasions.

The RACH occasions and the PUSCH resources may be defined so as to be in one-to-one correspondence with each other or the correspondence relationship between the RACH occasions and the PUSCH resources may be defined as in Embodiment 1 or Embodiment 2.

(Apparatus Configuration)

Next, an example of the functional configuration of the base station apparatus 10 and the user equipment 20 that perform the above-mentioned processes and operations will be described. The base station apparatus 10 and the user equipment 20 have a function of implementing the above-described embodiments. However, each of the base station apparatus 10 and the user equipment 20 may have only some of the functions described in the embodiments.

<Base Station Apparatus 10>

Figure 6:
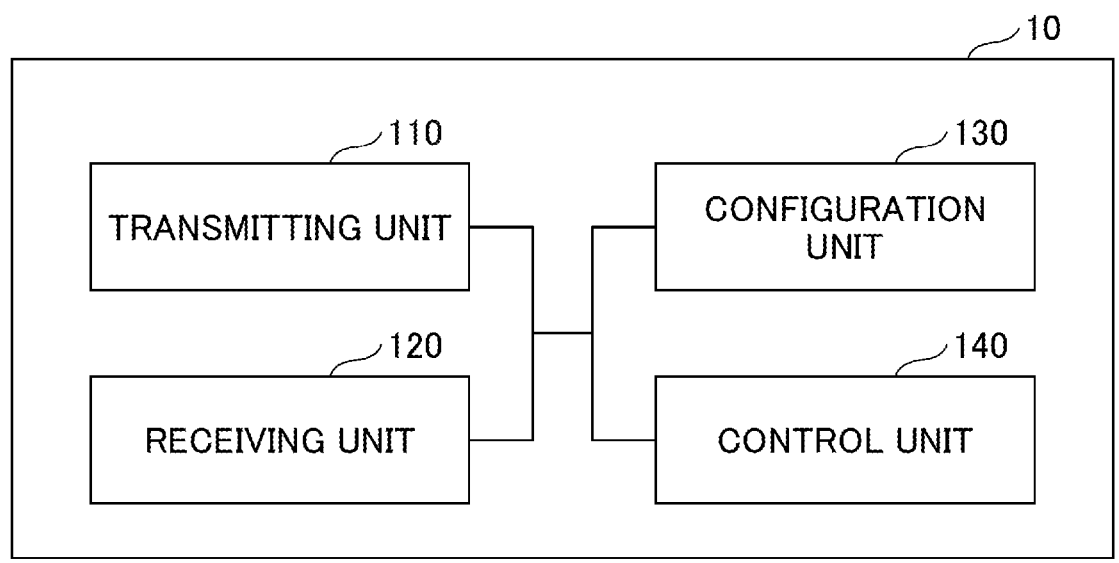
FIG. 6 is a diagram illustrating an example of the functional configuration of a base station apparatus 10.

FIG. 6 is a diagram illustrating an example of the functional configuration of the base station apparatus 10. As illustrated in FIG. 6, the base station apparatus 10 includes a transmitting unit 110, a receiving unit 120, a configuration unit 130, and a control unit 140. The functional configuration illustrated in FIG. 6 is only an example. The functional units may have any functions and any names as long as they can perform the operations according to the embodiments of the invention.

The transmitting unit 110 has a function that generates a signal to be transmitted to the user equipment 20 and wirelessly transmits the signal. The receiving unit 120 has a function that receives various signals transmitted from the user equipment 20 and acquires, for example, the information of an upper layer from the received signals. For example, the receiving unit 120 receives the message MsgA in the 2-step RACH from the user equipment 20 and the transmitting unit 110 transmits the message MsgB in the 2-step RACH to the user equipment 20.

The configuration unit 130 stores configuration information which has been configured in advance and various kinds of configuration information to be transmitted to the user equipment 20 in a storage device and reads the configuration information from the storage device if necessary.

For the control unit 140, a functional unit related to signal transmission in the control unit 140 may be included in the transmitting unit 110 and a functional unit related to signal reception in the control unit 140 may be included in the receiving unit 120.

<User Equipment 20>

Figure 7:
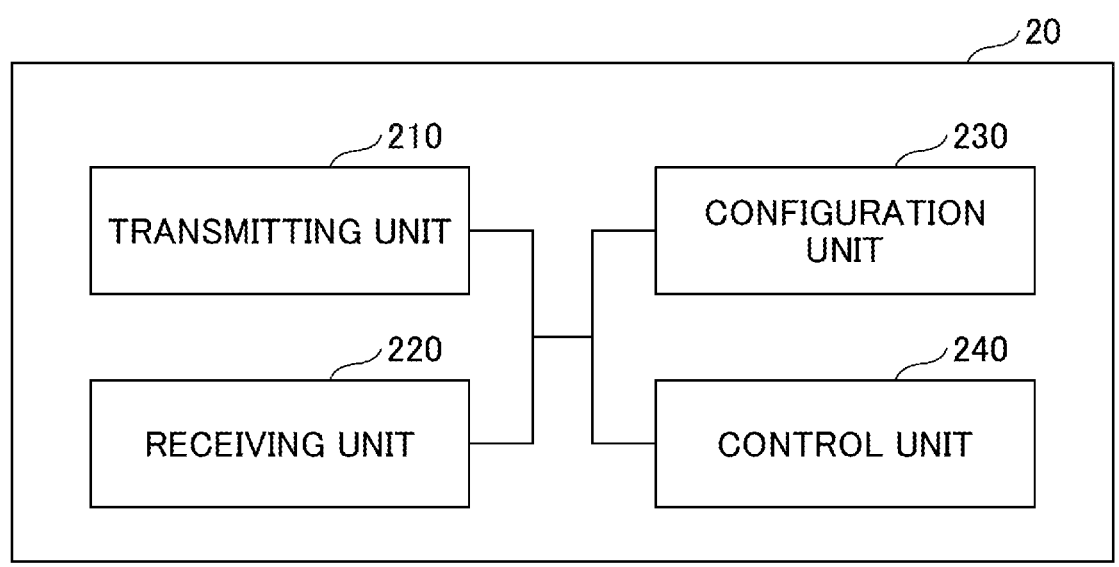
FIG. 7 is a diagram illustrating an example of the functional configuration of a user equipment 20.

FIG. 7 is a diagram illustrating an example of the functional configuration of the user equipment 20. As illustrated in FIG. 7, the user equipment 20 includes a transmitting unit 210, a receiving unit 220, a configuration unit 230, and a control unit 240. The functional configuration illustrated in FIG. 7 is only an example. The functional units may have any functions and any names as long as they can perform the operations according to the embodiments of the invention.

The transmitting unit 210 creates a transmission signal from transmission data and wirelessly transmits the transmission signal. The receiving unit 220 wirelessly receives various signals and acquires signals of an upper layer from the received signals of a physical layer. For example, the transmitting unit 210 transmits the message MsgA in the 2-step RACH to the base station apparatus 10 and the receiving unit 220 receives the message MsgB in the 2-step RACH from the base station apparatus 10.

The configuration unit 230 stores various kinds of configuration information received from the base station apparatus 10 by the receiving unit 220 in the storage device and reads the information from the storage device if necessary. In addition, the configuration unit 230 stores configuration information which has been configured in advance.

For the control unit 240, a functional unit related to signal transmission in the control unit 240 may be included in the transmitting unit 210 and a functional unit related to signal reception in the control unit 240 may be included in the receiving unit 220.

(Hardware Configuration)

The functional configuration diagrams (FIG. 6 and FIG. 7) used in the description of the above-mentioned embodiments of the invention illustrate the blocks of the functional units. The functional blocks (configuration units) are implemented by any combination of hardware and/or software. A means for implementing each functional block is not particularly limited. That is, each functional block may be implemented by one apparatus configured by physically and/or logically combining a plurality of elements or by connecting two or more apparatuses, which are physically and/or logically separated from each other, directly and/or indirectly (for example, wirelessly and/or in a wired manner) and using the plurality of apparatuses.

For example, each of the base station apparatus 10 and the user equipment 20 according to an embodiment of the invention may function as a computer that performs the process according to the embodiments of the invention. FIG. 6 is a diagram illustrating an example of the hardware configuration of a wireless communication device which is the base station apparatus 10 or the user equipment 20 according to the embodiment of the invention. Each of the base station apparatus 10 and the user equipment 20 may be physically configured as a computer apparatus that includes, for example, a processor 1001, a storage device 1002, an auxiliary storage device 1003, a communication device 1004, an input device 1005, an output device 1006, and a bus 1007.

Figure 8:
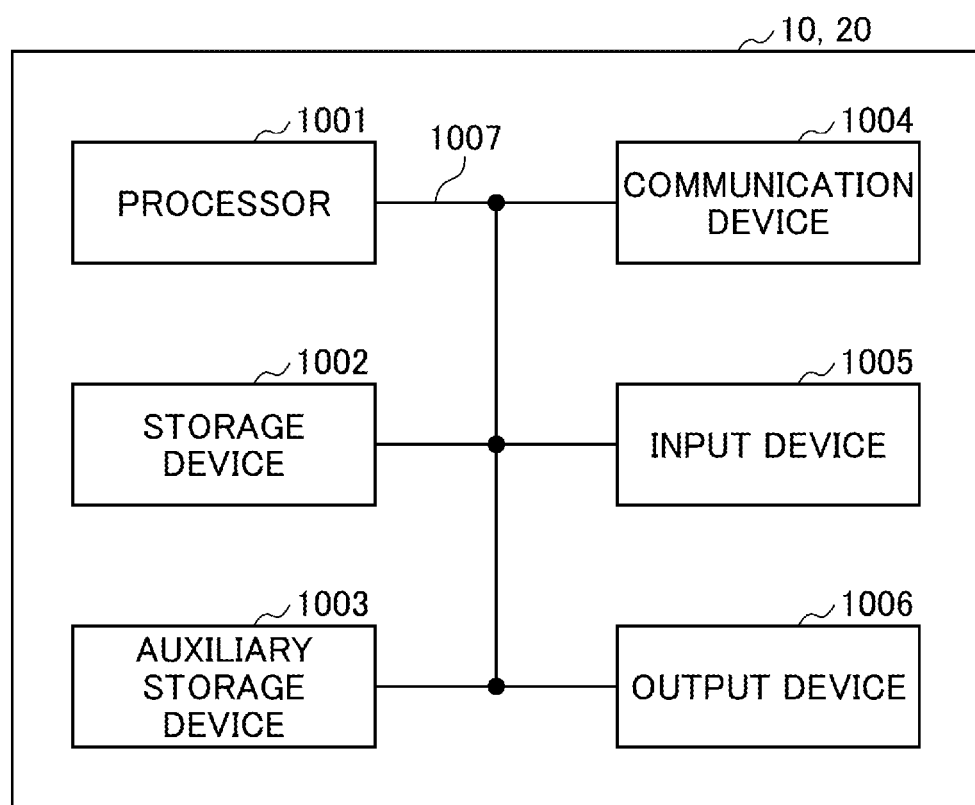
FIG. 8 is a diagram illustrating an example of the hardware configuration of the base station apparatus 10 and the user equipment 20.

In the following description, the term "apparatus" can be replaced with, for example, a circuit, a device, or a unit. The hardware configuration of the base station apparatus 10 and the user equipment 20 may be configured to include one or more of the devices represented by reference numerals 1001 to 1006 in FIG. 8 or may be configured not to include some of the devices.

Each of the functions of the base station apparatus 10 and the user equipment 20 is implemented by loading predetermined software (program) onto hardware, such as the processor 1001 and the storage device 1002, and causing the processor 1001 to perform an operation to control communication by the communication device 1004 and the reading and/or writing of data from and/or to the storage device 1002 and the auxiliary storage device 1003.

For example, the processor 1001 operates an operating system to control the entire computer. The processor 1001 may be a central processing unit (CPU) including, for example, an interface with peripheral devices, a control device, an arithmetic device, and a register.

The processor 1001 reads a program (program code), a software module, or data from the auxiliary storage device 1003 and/or the communication device 1004 to the storage device 1002 and performs various processes according to the read program, software module, or data. As the program, a program that causes the computer to perform at least some of the operations described in the above-mentioned embodiments is used. For example, the transmitting unit 110, the receiving unit 120, the configuration unit 130, and the control unit 140 of the base station apparatus 10 illustrated in FIG. 6 may be implemented by a control program that is stored in the storage device 1002 and is operated by the processor 1001. In addition, for example, the transmitting unit 210, the receiving unit 220, the configuration unit 230, and the control unit 240 of the user equipment 20 illustrated in FIG. 7 may be implemented by a control program that is stored in the storage device 1002 and is operated by the processor 1001. In the above description, the various processes are performed by one processor 1001. However, the various processes may be performed sequentially or at the same time by two or more processors 1001. The processor 1001 may be implemented by one or more chips. The program may be transmitted from the network through a telecommunication line.

The storage device 1002 is a computer-readable recording medium and may be configured by, for example, at least one of a read only memory (ROM), an erasable programmable ROM (EPROM), an electrically erasable programmable ROM (EEPROM), and a random access memory (RAM). The storage device 1002 may be referred to as, for example, a register, a cache, or a main memory (main storage device). The storage device 1002 can store, for example, an executable program (program code) or a software module for performing the process according to an embodiment of the invention.

The auxiliary storage device 1003 is a computer-readable recording medium and may be configured by, for example, at least one of an optical disc, such as a compact disc ROM (CD-ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a Floppy (registered trademark) disk, and a magnetic strip. The auxiliary storage device 1003 may also be referred to as an auxiliary storage device. The above-mentioned storage medium may be, for example, a database, a server, or other appropriate media including the storage device 1002 and/or the auxiliary storage device 1003.

The communication device 1004 is hardware (transmitting and receiving device) for communication between computers through a wired network and/or a wireless network and is referred to as, for example, a network device, a network controller, a network card, or a communication module. For example, the transmitting unit 110 and the receiving unit 120 of the base station apparatus 10 may be implemented by the communication device 1004. In addition, the transmitting unit 210 and the receiving unit 220 of the user equipment 20 may be implemented by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may be integrated (for example, a touch panel).

The devices, such as the processor 1001 and the storage device 1002, are connected to each other by the bus 1007 for information communication. The bus 1007 may be a single bus or different buses between the devices.

Each of the base station apparatus 10 and the user equipment 20 may include hardware, such as a microprocessor, a digital signal processor (DSP), an application specific integrated circuit (ASIC), a programmable logic device (PLD), and a field programmable gate array (FPGA) and some or all of the functional blocks may be implemented by the hardware. For example, the processor 1001 may be implemented by at least one of the hardware components.

Summary of Embodiments

As described above, according to this embodiment of the invention, there is provided a user equipment including: a transmitting unit that transmits first data in a first step of a 2-step RACH for a contention based random access procedure; and a receiving unit that receives second data in a second step of the 2-step RACH for the contention based random access procedure. The first data includes a preamble and a PUSCH and information indicating a predetermined correspondence relationship of a PUSCH resource is indicated or defined.

A technique that can appropriately determine a correspondence relationship between a preamble and a PUSCH included in the message MsgA transmitted from the user equipment in a wireless communication system to which the 2-step RACH for the contention based random access procedure is applied is provided by the user equipment.

Supplement of Embodiments

The embodiments of the invention have been described above. However, the disclosed invention is not limited to the embodiments. Those skilled in the art can understand various modifications, corrections, substitutions, replacements, and the like. The description has been made using specific numerical examples in order to facilitate the understanding of the invention. These numerical values are only examples and any appropriate values may be used unless otherwise stated. The classification of the items in the above description is not essential, but matters described in two or more items may be combined and used if necessary or matters described in a certain item may be applied to matters described in other items (unless the matters are inconsistent). The boundaries of the functional units or the processing units in the functional block diagrams may not necessarily correspond to the boundaries of physical components. The operations of the plurality of functional units may be performed physically by one component or the operation of one functional unit may be performed physically by a plurality of components. For the process procedures described in the embodiments, the order of the processes may be switched without being inconsistent. In order to facilitate the description of the processes, the base station apparatus 10 and the user equipment 20 have been described with reference to the functional block diagrams. However, the apparatuses may be implemented by hardware, software, or a combination thereof. Each of software operated by the processor included in the base station apparatus 10 according to the embodiments of the invention and software operated by the processor included in the user equipment 20 according to the embodiments of the invention may be stored in a random access memory (RAM), a flash memory, a read-only memory (ROM), an EPROM, an EEPROM, a register, a hard disk drive (HDD), a removable disk, a CD-ROM, a database, a server, or other appropriate storage media.

The indication of information is not limited to the aspects/embodiments described in the specification and may be performed by other methods. For example, the indication of information may be performed by physical layer signaling (for example, downlink control information (DCI) or uplink control information (UCI)), upper layer signaling (for example, radio resource control (RRC) signaling, medium access control (MAC) signaling, or broadcast information (a master information block (MIB) or a system information block (SIB)), other types of signaling, or a combination thereof. The RRC signaling may also be referred to as an RRC message. For example, the RRC signaling may be an RRC connection setup message or an RRC connection reconfiguration message.

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other appropriate systems and/or next-generation systems extended on the basis of these systems.

For example, the order of the process procedures, the sequence, and the flowchart in each aspect/embodiment described in the specification may be interchanged as long as there is no contradiction. For example, in the method described in the specification, elements of various steps are presented in an exemplary order and the invention is not limited to the presented specific order.

In the specification, a specific operation performed by the base station apparatus 10 may also be performed by an upper node according to circumstances. In a network including one network node or a plurality of network nodes having the base station apparatus 10, it is clear that various operations performed to communicate with the user equipment 20 can be performed by the base station apparatus 10 and/or a network node (for example, MME or S-GW is considered, but the network node is not limited thereto) other than the base station apparatus 10. The case in which the number of network nodes other than the base station apparatus 10 is 1 has been exemplified above. However, a plurality of other network nodes (for example, MME and S-GW) may be combined with each other.

The aspects/embodiments described in the specification may be independently used, may be combined and used, or may be switched and used in association with execution.

The user equipment 20 may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms, depending on the person skilled in the art.

The base station apparatus 10 may be referred to as NodeB (NB), evolved NodeB (eNB), gNB, a base station, or some other suitable terms, depending on the person skilled in the art.

The term "determining" used in the specification includes a wide variety of operations in some cases. The "determining" can include cases in which performing, for example, judging, calculating, computing, processing, deriving, investigating, looking up (for example, looking up in a table, a database, or other data structures), and ascertaining is considered to perform "determining". In addition, the "determining" can include cases in which performing, for example, receiving (for example, receiving information), transmitting (for example, transmitting information), inputting, outputting, and accessing (for example, accessing data in a memory) is considered to perform "determining". Further, the "determining" can include cases in which performing, for example, resolving, selecting, choosing, establishing, and comparing is considered to perform "determining". That is, the "determining" can include a case in which any operation is considered to perform "determining".

The term "based on" used in the specification does not mean "based on only" unless otherwise stated. In other words, the term "based on" means both "based on only" and "based on at least".

The terms "include", "including", and modifications thereof are intended to be inclusive as in the term "comprising" as long as they are used in the specification or the claims. Further, the term "or" used in the specification or the claims is not intended to be an exclusive OR.

In the entire present disclosure, for example, in a case in which the articles, such as a, an, and the, in English are added in translation, the articles may indicate plurality if they do not clearly indicate singular nouns in the context.

The invention has been described in detail above. However, it should be apparent to those skilled in the art that the invention is not limited to the embodiments described in the specification. The invention can be embodied as corrected and changed aspects without departing from the scope and spirit of the invention defined by the claims. Therefore, the description of the specification has been made for exemplary description and is not intended to have any restrictive meaning to the invention.

EXPLANATIONS OF LETTERS OR NUMERALS

10 BASE STATION APPARATUS
110 TRANSMITTING UNIT
120 RECEIVING UNIT
130 CONFIGURATION UNIT
140 CONTROL UNIT
20 USER EQUIPMENT
210 TRANSMITTING UNIT
220 RECEIVING UNIT
230 CONFIGURATION UNIT
240 CONTROL UNIT
1001 PROCESSOR
1002 STORAGE DEVICE
1003 AUXILIARY STORAGE DEVICE

1004 COMMUNICATION DEVICE
1005 INPUT DEVICE
1006 OUTPUT DEVICE

The invention claimed is:

1. A terminal comprising:
   a receiver that receives configuration information related to a 2-step random access procedure from a base station;
   a processor that:
      calculates, based on a number of resources for physical uplink shared channel (PUSCH) transmissions included in the configuration information and a number of resource occasions for physical random access channel (PRACH) transmission, a number of resources for the PRACH transmission corresponding to a resource for the PUSCH transmission, and
      associates indexes of the resources for the PRACH transmission with the resources for the PUSCH transmissions, in an order of a frequency direction, and then, in an order of a time direction; and
   a transmitter that transmits, to a base station, a PUSCH via a slot that is determined based on a slot of a PRACH and an offset included in the configuration information.

2. A system comprising: a base station; and a terminal, wherein
   the base station includes a transmitter that transmits configuration information related to a 2-step random access procedure to the terminal, and
   the terminal includes:
      a receiver that receives the configuration information from the base station;
      a processor that:
         calculates, based on a number of resources for physical uplink shared channel (PUSCH) transmissions included in the configuration information and a number of resource occasions for PRACH transmission, a number of resources for the physical random access channel (PRACH) transmission corresponding to a resource for the PUSCH transmission, and
         associates indexes of the resources for the PRACH transmission with the resources for the PUSCH transmissions, in an order of a frequency direction, and then, in an order of a time direction; and
      a transmitter that transmits, to a base station, a PUSCH via a slot that is determined based on a slot of a PRACH and an offset included in the configuration information.

3. A communication method of a terminal, the communication method comprising:
   receiving configuration information related to a 2-step random access procedure from a base station;
   calculating, based on a number of resources for physical uplink shared channel (PUSCH) transmissions included in the configuration information and a number of resource occasions for physical random access channel (PRACH) transmission, a number of resources for the PRACH transmission corresponding to a resource for the PUSCH transmission;
   associating indexes of the resources for the PRACH transmission with the resources for the PUSCH transmissions, in an order of a frequency direction, and then, in an order of a time direction; and
   transmitting, to a base station, a PUSCH via a slot that is determined based on a slot of a PRACH and an offset included in the configuration information.

* * * * *